(12) United States Patent
Laakko

(10) Patent No.: US 12,013,222 B2
(45) Date of Patent: Jun. 18, 2024

(54) BLASTING PLAN LOGGER, RELATED METHODS AND COMPUTER PROGRAM PRODUCTS

(71) Applicant: Pyylahti Oy, Helsinki (FI)

(72) Inventor: Tapio Laakko, Helsinki (FI)

(73) Assignee: Pyylahti Oy, Helsinki (FI)

( * ) Notice: Subject to any disclaimer, the term of this patent is extended or adjusted under 35 U.S.C. 154(b) by 916 days.

(21) Appl. No.: 16/964,719

(22) PCT Filed: Dec. 20, 2018

(86) PCT No.: PCT/FI2018/050955
§ 371 (c)(1),
(2) Date: Jul. 24, 2020

(87) PCT Pub. No.: WO2019/145598
PCT Pub. Date: Aug. 1, 2019

(65) Prior Publication Data
US 2020/0355483 A1    Nov. 12, 2020

(30) Foreign Application Priority Data

Jan. 26, 2018 (FI) ..................................... 20185075

(51) Int. Cl.
*F42D 1/055* (2006.01)
*G06F 16/23* (2019.01)
(Continued)

(52) U.S. Cl.
CPC ......... *F42D 1/055* (2013.01); *G06F 16/2365* (2019.01); *G06K 19/0723* (2013.01); *G01S 19/42* (2013.01)

(58) Field of Classification Search
CPC ......... E21B 7/007; E21B 7/046; E21D 9/006; F42D 1/055; F42D 3/04
See application file for complete search history.

(56) References Cited

U.S. PATENT DOCUMENTS 5,020,435 A    6/1991 Cawte
7,594,471 B2 *  9/2009 Koekemoer .............. F42D 1/05
                                                  102/215
(Continued)

FOREIGN PATENT DOCUMENTS

EP         0 897 098 A2    2/1999
WO    WO 2008/074071 A1    6/2008
(Continued)

OTHER PUBLICATIONS

International Search Report for corresponding International Patent Application No. PCT/FI2018/050955 dated Mar. 19, 2019, 4 pages.
(Continued)

*Primary Examiner* — Kenneth L Thompson
(74) *Attorney, Agent, or Firm* — Merchant & Gould P.C.

(57) ABSTRACT

The invention allows improved planning and implementation of blasting operations. The location of a hand-held apparatus (200) is determined based on signaling received by a high-accuracy positioning unit (220). If the location corresponds with a location of a bore hole in a stored blasting plan, an electronic detonator selected by a user is identified based on its identifier read by a NFC reader (230) of the hand-held apparatus (200), and the stored blasting plan is updated with the hand-held apparatus (200) to indicate that the assigned electronic detonator has been set in the bore hole.

19 Claims, 4 Drawing Sheets

(51) Int. Cl.
    *G06K 19/07*     (2006.01)
    *G01S 19/42*     (2010.01)

(56) References Cited

U.S. PATENT DOCUMENTS

| | | | |
|---|---|---|---|
| 7,975,613 B2* | 7/2011 | Labuschagne | F42D 1/055 |
| | | | 102/215 |
| 9,091,518 B2* | 7/2015 | Lownds | F42D 1/045 |
| 9,958,247 B2* | 5/2018 | Teowee | F42D 1/055 |
| 11,029,135 B2* | 6/2021 | Howe | F42D 1/05 |
| 2004/0225431 A1 | 11/2004 | Aebi et al. | |
| 2005/0103219 A1 | 5/2005 | McClure et al. | |
| 2005/0263027 A1 | 12/2005 | Johnston et al. | |
| 2014/0026775 A1* | 1/2014 | Papillon | F42D 1/055 |
| | | | 102/215 |
| 2019/0049226 A1* | 2/2019 | Liebenberg | F42D 3/06 |

FOREIGN PATENT DOCUMENTS

| | | |
|---|---|---|
| WO | WO 2015/066736 A2 | 5/2015 |
| WO | WO 2015/168709 A2 | 11/2015 |
| WO | WO 2016/183601 A1 | 11/2016 |

OTHER PUBLICATIONS

Written Opinion of the International Searching Authority for corresponding International Patent Application No. PCT/FI2018/050955 dated Mar. 19, 2019, 9 pages.

Finnish Search Report for corresponding Finnish U.S. Appl. No. 20/185,075 dated May 21, 2018, 2 pages.

* cited by examiner

BLASTING PLAN LOGGER, RELATED METHODS AND COMPUTER PROGRAM PRODUCTS

This application is a National Stage Application of PCT/FI2018/050955, filed 20 Dec. 2018, which claims benefit of Patent Application Serial No. 20185075, filed 26 Jan. 2018 in Finland and which applications are incorporated herein by reference. To the extent appropriate, a claim of priority is made to each of the above disclosed applications.

BACKGROUND OF THE INVENTION

Field of the Invention

The present application generally relates to blasting operations. In particular, the present application relates to planning and implementing blasting operations.

Description of the Related Art

Planning and implementing a blasting operation currently requires typically at least four separate devices: a purpose-built Global Positioning System (GPS) device, a computer, a purpose-built logger device and an initiating device.

The purpose-built GPS-device is used to obtain GPS locations of the bore holes. Alternatively, GPS locations of the bore holes are not obtained at all. Such purpose-built GPS-devices are typically accurate but expensive. The computer has design software usually provided by detonator manufacturer(s). Typically, a blasting plan can only be created with this software. A completed blasting plan is transferred from the computer to the purpose-built logger device via a Bluetooth or cable connection. The purpose-built logger device is then used to scan barcodes or Quick Response (QR) codes of the detonators that will be used at the blasting field. This information is sent to the initiating device which is used to blast the field. Finally, the initiating device will be connected to a primary wire of the field, and the field will be blasted with the initiating device.

Typically, the current devices do not allow remotely reviewing the blasting design process in real time, e.g. by a supervisor. The devices and software needed to program the detonators are usually purchased along with other electronics provided by detonator manufacturers or retailers.

Furthermore, the current devices and software are lacking in safety features. For example, even if GPS locations of the bore holes are obtained for the blasting plan, there is no opportunity for the blasting personnel setting the detonators and explosives for the bore holes at the field to obtain the GPS coordinates of the bore hole currently being worked on. Making sure that the GPS coordinates of the bore hole currently being worked on match the GPS coordinates of a given bore hole in the blasting plan allows avoiding mistakes, such as setting incorrect detonators and/or explosives for the given bore hole.

As another example, when several detonators are to be set for the given bore hole so that each detonator is at a different position vertically (e.g. one detonator is at the bottom region of the bore hole and another detonator is at the surface region of the bore hole), the current devices and software do not allow ensuring that such multiple detonators per one bore hole are deployed in correct order in the bore hole.

As yet another example, the current devices and software do not allow ensuring that none of the bore holes will accidentally be left without the detonators and/or explosives assigned for them in the blasting plan.

SUMMARY OF THE INVENTION

An embodiment of a hand-held apparatus comprises a display, a high-accuracy positioning unit, a detonator identifier reader, at least one processor, and at least one memory comprising computer program code. The at least one memory and the computer program code are configured to, with the at least one processor, cause the hand-held apparatus to at least:
  determine the location of the hand-held apparatus based on signaling received by the high-accuracy positioning unit;
  in response to the determined location of the hand-held apparatus corresponding with a location of a bore hole in a stored blasting plan:
  identify an electronic detonator based on an identifier of the electronic detonator read by the detonator identifier reader; and update the stored blasting plan to indicate that the identified electronic detonator has been set in the bore hole.

In an embodiment, alternatively or in addition to the above described embodiments, the at least one memory and the computer program code are further configured to, with the at least one processor, cause the hand-held apparatus to indicate on the display at least one electronic detonator assigned for the bore hole in the stored blasting plan before identifying the electronic detonator. The updating of the stored blasting plan comprises: in response to the identified electronic detonator corresponding with the at least one assigned electronic detonator, updating the stored blasting plan to indicate that the at least one assigned electronic detonator has been set in the bore hole.

In an embodiment, alternatively or in addition to the above described embodiments, the at least one electronic detonator assigned for the bore hole in the stored blasting plan comprises at least a first assigned electronic detonator and a second assigned electronic detonator. The first assigned electronic detonator is to be placed lower in the bore hole than the second assigned electronic detonator. The at least one memory and the computer program code are further configured to, with the at least one processor, cause the hand-held apparatus to perform the indication of the at least one assigned electronic detonator on the display by first indicating the first assigned electronic detonator on the display, and subsequently indicating the second assigned electronic detonator on the display in response to determining that the identified electronic detonator corresponds with the first assigned electronic detonator.

In an embodiment, alternatively or in addition to the above described embodiments, each electronic detonator comprises a detonator wire having a length that corresponds with one of multiple predetermined length categories.

In an embodiment, alternatively or in addition to the above described embodiments, at least one electronic detonator further comprises a visual length indicator to indicate the corresponding length category of the detonator wire of the respective electronic detonator.

In an embodiment, alternatively or in addition to the above described embodiments, the visual length indicator comprises a color coded visual length indicator.

In an embodiment, alternatively or in addition to the above described embodiments, the indication of the at least one assigned electronic detonator on the display further comprises indicating on the display the visual length indicator of the respective assigned electronic detonator.

In an embodiment, alternatively or in addition to the above described embodiments, the identifier of the electronic detonator comprises an identification code of the electronic detonator and a length code corresponding with the length category of the detonator wire of the electronic detonator.

In an embodiment, alternatively or in addition to the above described embodiments, the indication of the at least one assigned electronic detonator on the display further comprises indicating on the display the amount of assigned electronic detonators in the stored blasting plan left to be set.

In an embodiment, alternatively or in addition to the above described embodiments, the at least one memory and the computer program code are further configured to, with the at least one processor, cause the hand-held apparatus to generate a bore hole map to be used for the blasting plan to be stored based on locations of each bore hole determined with the high-accuracy positioning unit of the hand-held apparatus.

In an embodiment, alternatively or in addition to the above described embodiments, the hand-held apparatus further comprises a wireless transceiver. The at least one memory and the computer program code are further configured to, with the at least one processor, cause the hand-held apparatus to at least one of: download the blasting plan to be stored in the hand-held apparatus from a remote database via the wireless transceiver, and upload the updated blasting plan to the remote database via the wireless transceiver.

In an embodiment, alternatively or in addition to the above described embodiments, the updating of the stored blasting plan further comprises at least one of: updating a delay for at least one assigned electronic detonator, and updating the amount of explosives assigned to a bore hole.

In an embodiment, alternatively or in addition to the above described embodiments, the detonator identifier reader comprises a near field communication tag reader and the identifier of the electronic detonator is comprised in a near field communication tag associated with the electronic detonator.

In an embodiment, alternatively or in addition to the above described embodiments, the high-accuracy positioning unit comprises at least one of: a positioning unit capable of positioning accuracy of at least substantially 50 centimeters, and a positioning unit capable of utilizing L5 positioning signaling.

In an embodiment, alternatively or in addition to the above described embodiments, the at least one memory and the computer program code are further configured to, with the at least one processor, cause the hand-held apparatus to determine a difference between one or more parameters in the stored blasting plan and corresponding one or more parameters in the updated blasting plan.

In an embodiment, alternatively or in addition to the above described embodiments, the at least one memory and the computer program code are further configured to, with the at least one processor, cause the hand-held apparatus to at least one of: indicate the determined difference, and generate a request to accept or reject the determined difference.

In an embodiment, alternatively or in addition to the above described embodiments, the at least one memory and the computer program code are further configured to, with the at least one processor, cause the hand-held apparatus to compare the determined difference against a predetermined threshold, and in response to the determined difference exceeding the predetermined threshold, to generate an alert.

In an embodiment, alternatively or in addition to the above described embodiments, the hand-held apparatus is associated with a context based safety device allowing use of the hand-held apparatus only within a specified context.

An embodiment of a method comprises:
determining, by a hand-held apparatus, the location of the hand-held apparatus based on signaling received by a high-accuracy positioning unit of the hand-held apparatus;
in response to the determined location of the hand-held apparatus corresponding with a location of a bore hole in a stored blasting plan:
identifying, by the hand-held apparatus, an electronic detonator based on an identifier of the electronic detonator read by a detonator identifier reader of the hand-held apparatus; and
updating, by the hand-held apparatus, the stored blasting plan to indicate that the identified electronic detonator has been set in the bore hole.

In an embodiment, alternatively or in addition to the above described embodiments, the method further comprises indicating on the display at least one electronic detonator assigned for the bore hole in the stored blasting plan before identifying the electronic detonator. The updating of the stored blasting plan comprises: in response to the identified electronic detonator corresponding with the at least one assigned electronic detonator, updating the stored blasting plan to indicate that the at least one assigned electronic detonator has been set in the bore hole.

In an embodiment, alternatively or in addition to the above described embodiments, the at least one electronic detonator assigned for the bore hole in the stored blasting plan comprises at least a first assigned electronic detonator and a second assigned electronic detonator. The first assigned electronic detonator is to be placed lower in the bore hole than the second assigned electronic detonator. The indicating of the at least one assigned electronic detonator on the display comprises first indicating the first assigned electronic detonator on the display, and subsequently indicating the second assigned electronic detonator on the display in response to determining that the identified electronic detonator corresponds with the first assigned electronic detonator.

In an embodiment, alternatively or in addition to the above described embodiments, each electronic detonator comprises a detonator wire having a length that corresponds with one of multiple predetermined length categories.

In an embodiment, alternatively or in addition to the above described embodiments, at least one electronic detonator further comprises a visual length indicator to indicate the corresponding length category of the detonator wire of the respective electronic detonator.

In an embodiment, alternatively or in addition to the above described embodiments, the visual length indicator comprises a color coded visual length indicator.

In an embodiment, alternatively or in addition to the above described embodiments, the indicating of the at least one assigned electronic detonator on the display further comprises indicating on the display the visual length indicator of the respective assigned electronic detonator.

In an embodiment, alternatively or in addition to the above described embodiments, the identifier of the electronic detonator comprises an identification code of the electronic detonator, and a length code corresponding with the length category of the detonator wire of the electronic detonator.

In an embodiment, alternatively or in addition to the above described embodiments, the indicating of the at least one assigned electronic detonator on the display further comprises indicating on the display the amount of assigned electronic detonators in the stored blasting plan left to be set.

In an embodiment, alternatively or in addition to the above described embodiments, the method further comprises generating, by the hand-held apparatus, a bore hole map to be used for the blasting plan to be stored based on locations of each bore hole determined with the high-accuracy positioning unit of the hand-held apparatus.

In an embodiment, alternatively or in addition to the above described embodiments, the hand-held apparatus further comprises a wireless transceiver. The method further comprises at least one of: downloading, to the hand-held apparatus, the blasting plan to be stored in the hand-held apparatus from a remote database via the wireless transceiver, and uploading, from the hand-held apparatus, the updated blasting plan to the remote database via the wireless transceiver.

In an embodiment, alternatively or in addition to the above described embodiments, the updating of the stored blasting plan further comprises at least one of: updating a delay for at least one assigned electronic detonator, and updating the amount of explosives assigned to a bore hole.

In an embodiment, alternatively or in addition to the above described embodiments, the detonator identifier reader comprises a near field communication tag reader and the identifier of the electronic detonator is comprised in a near field communication tag associated with the electronic detonator.

In an embodiment, alternatively or in addition to the above described embodiments, the high-accuracy positioning unit comprises at least one of: a positioning unit capable of positioning accuracy of at least substantially 50 centimeters, and a positioning unit capable of utilizing L5 positioning signaling.

In an embodiment, alternatively or in addition to the above described embodiments, the method further comprises determining, by the hand-held apparatus, a difference between one or more parameters in the stored blasting plan and corresponding one or more parameters in the updated blasting plan.

In an embodiment, alternatively or in addition to the above described embodiments, the method further comprises at least one of: indicating by the hand-held apparatus the determined difference, and generating by the hand-held apparatus a request to accept or reject the determined difference.

In an embodiment, alternatively or in addition to the above described embodiments, the method further comprises comparing by the hand-held apparatus the determined difference against a predetermined threshold, and in response to the determined difference exceeding the predetermined threshold, generating by the hand-held apparatus an alert.

In an embodiment, alternatively or in addition to the above described embodiments, the hand-held apparatus is associated with a context based safety device allowing use of the hand-held apparatus only within a specified context.

An embodiment of a computer program product comprises at least one computer-readable storage medium. The computer-readable storage medium comprises a set of instructions, which, when executed by one or more processors, cause a hand-held apparatus to at least perform:

determining, by a hand-held apparatus, the location of the hand-held apparatus based on signaling received by a high-accuracy positioning unit of the hand-held apparatus;

in response to the determined location of the hand-held apparatus corresponding with a location of a bore hole in a stored blasting plan: indicating on a display of the hand-held apparatus at least one electronic detonator assigned for the bore hole in the stored blasting plan;

identifying, by the hand-held apparatus, an electronic detonator based on an identifier of the electronic detonator read by a detonator identifier reader of the hand-held apparatus; and in response to the identified electronic detonator corresponding with the at least one assigned electronic detonator: updating, by the hand-held apparatus, the stored blasting plan to indicate that the at least one assigned electronic detonator has been set in the bore hole.

An embodiment of a computer program comprises a set of instructions. The computer program may be stored on a computer readable medium. When executed, the set of instructions are configured to cause a hand-held apparatus to at least perform:

determining, by a hand-held apparatus, the location of the hand-held apparatus based on signaling received by a high-accuracy positioning unit of the hand-held apparatus;

in response to the determined location of the hand-held apparatus corresponding with a location of a bore hole in a stored blasting plan:

identifying, by the hand-held apparatus, an electronic detonator based on an identifier of the electronic detonator read by a detonator identifier reader of the hand-held apparatus; and updating, by the hand-held apparatus, the stored blasting plan to indicate that the identified electronic detonator has been set in the bore hole.

At least some of the embodiments allow reducing the number of devices required for planning and implementing blasting operations. Accordingly, associated costs are reduced.

Furthermore, at least some of the embodiments allow improved safety features. For example, the blasting personnel setting the detonators and explosives for the bore holes at the field is able to obtain the GPS coordinates of the bore hole currently being worked on and thus able to ensure that the GPS coordinates of the bore hole currently being worked on match the GPS coordinates of a given bore hole in the blasting plan. This allows avoiding mistakes, such as setting incorrect detonators and/or explosives for the given bore hole.

Furthermore, when several detonators are to be set for the given bore hole so that each detonator is at a different position vertically (e.g. one detonator is at the bottom region of the bore hole and another detonator is at the surface region of the bore hole), at least some of the embodiments allow ensuring that such multiple detonators per one bore hole are deployed in correct order in the bore hole, e.g. via verification of color coded or other visual length indicators for the detonator wires.

Furthermore, at least some of the embodiments allow ensuring that none of the bore holes will accidentally be left without the detonators and/or explosives assigned for them in the blasting plan.

Furthermore, at least some of the embodiments allow remotely reviewing the blasting design process in real time, e.g. by a supervisor.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

Like reference numerals are used to designate like parts in the accompanying drawings.

DETAILED DESCRIPTION OF THE INVENTION

Reference will now be made in detail to embodiments of the present invention, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
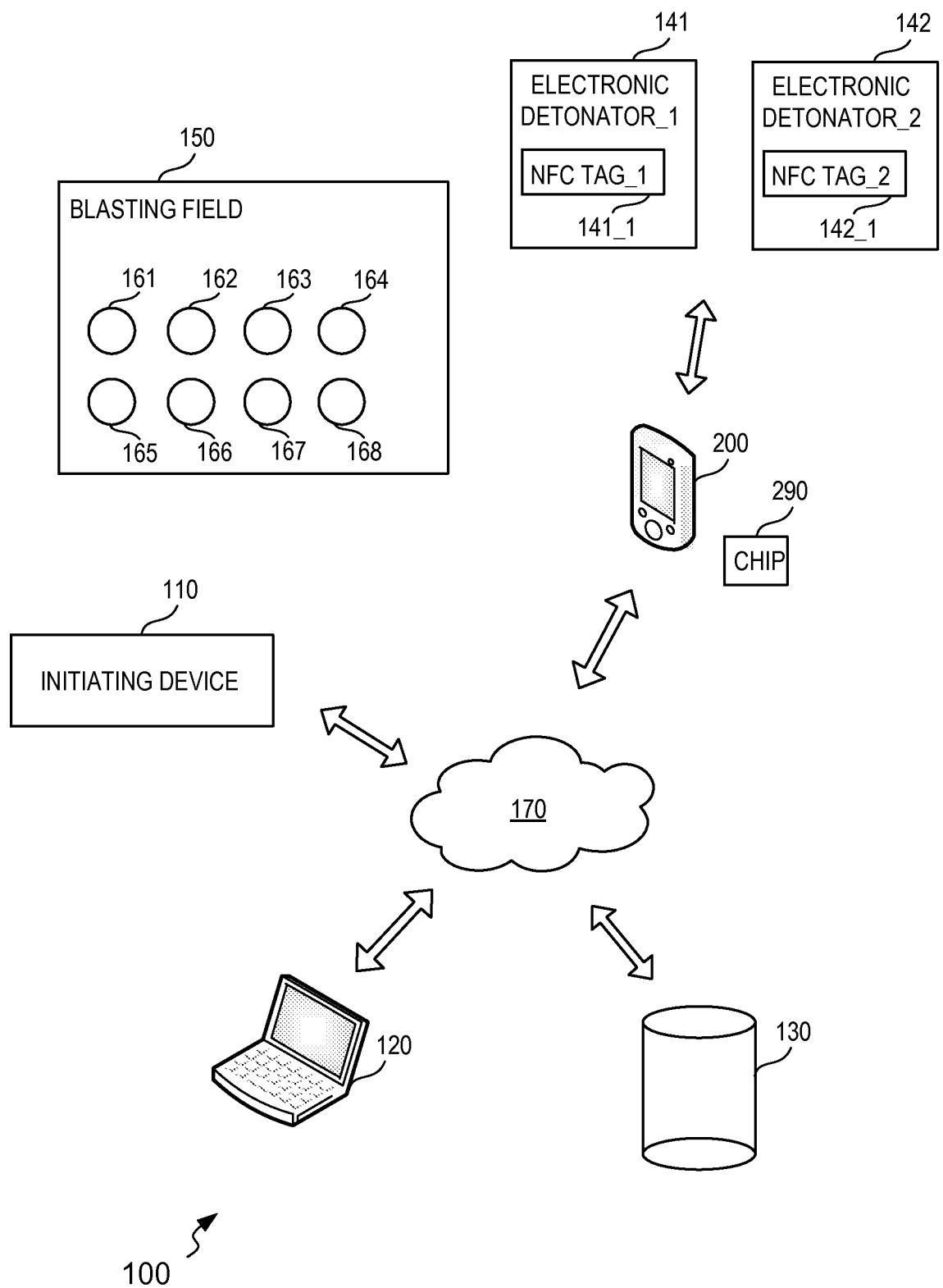
FIG. 1 illustrates an overview of an example system, where various embodiments of the present disclosure may be implemented.

FIG. 1 illustrates an overview of an example system 100 in which various embodiments of the present disclosure may be implemented. An example representation of the system 100 is shown depicting a network 170 that connects entities such as a hand-held apparatus 200, an initiating device 110, an optional computing device 120, and a remote database 130. The network 170 may be a centralized network or may comprise a plurality of subnetworks that may offer a direct communication between the entities or may offer indirect communication between the entities. Examples of the network 170 include wireless networks, wired networks, and combinations thereof. Some non-exhaustive examples of wireless networks may include wireless local area networks (WLANs), Bluetooth or Zigbee networks, cellular networks and the like. Some non-exhaustive examples of wired networks may include Local Area Networks (LANs), Ethernet, Fiber Optic networks and the like. An example of a combination of wired networks and wireless networks may include the Internet.

Figure 2:
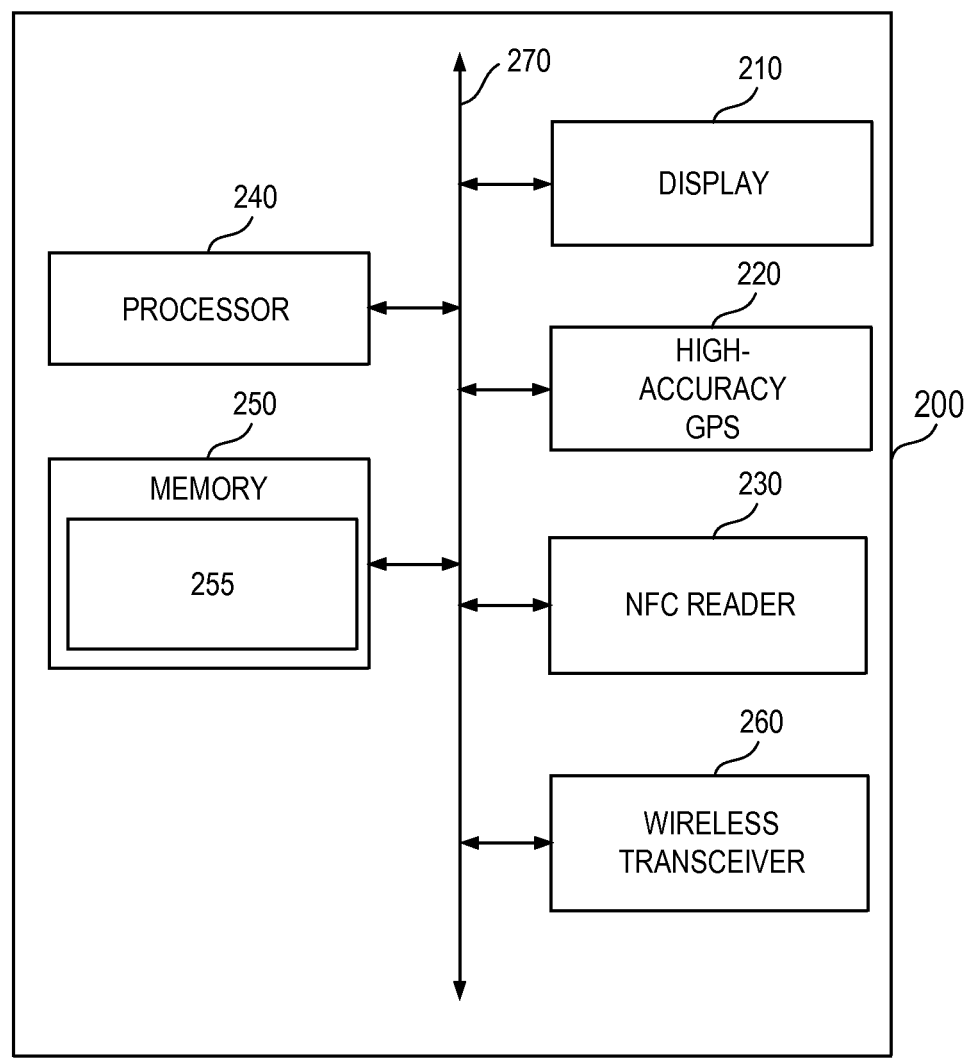
FIG. 2 illustrates a block diagram of a hand-held apparatus in accordance with an example embodiment.
Figure 4:
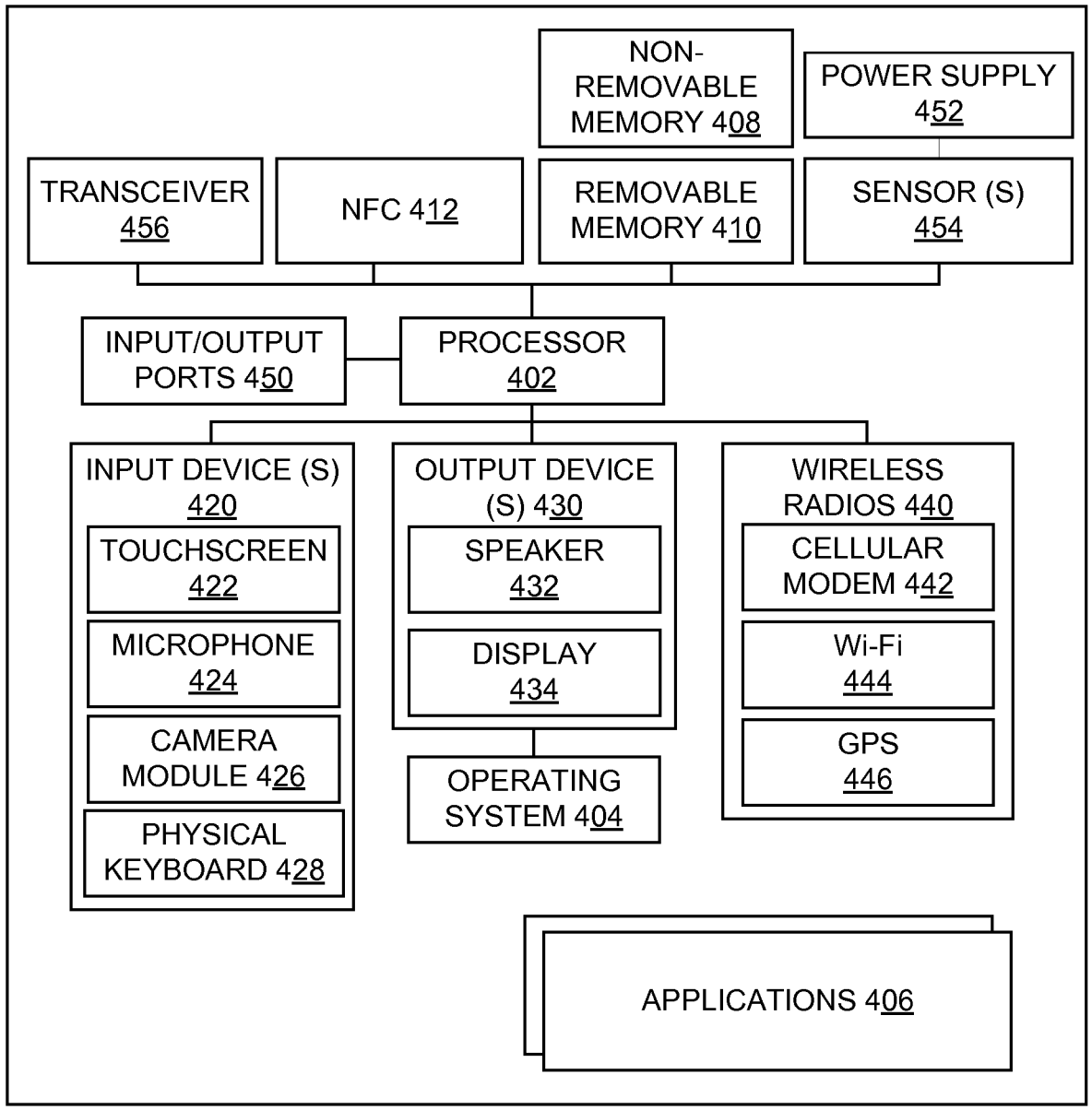
FIG. 4 illustrates another example of a hand-held apparatus capable of implementing example embodiments described herein.

The hand-held apparatus 200 may include e.g. the hand-held apparatus 200 of FIG. 2 and/or the hand-held apparatus 400 of FIG. 4. The hand-held apparatus 200 may include e.g. a smart phone, tablet computer, laptop computer, a two-in-one hybrid (also known as laptop-tablet hybrid) computer, or the like. The optional computing device 120 may include e.g. a smart phone, tablet computer, laptop computer, a two-in-one hybrid computer, a desktop computer, a network terminal, or the like. As described in more detail below, the hand-held apparatus 200 may be used or may function as a blasting plan logger.

The hand-held apparatus 200, the initiating device 110 and/or the optional computing device 120 may utilize the remote database 130. For example, bore hole maps, topographic maps and/or blasting plans utilized in the various embodiments described herein may be stored in the database 130 in addition to storing their local copies in the hand-held apparatus 200, the initiating device 110 and/or the optional computing device 120.

The system 100 further includes electronic detonators 141, 142. As is known in the art, electronic (or digital) detonators are designed to provide precise control necessary to produce accurate and consistent blasting results in a variety of blasting applications e.g. in mining, quarrying, and construction industries. Typically, delays for electronic detonators may be programmed in one-millisecond increments from 1 millisecond to 16000 milliseconds. The delay assigned for an electronic detonator is programmed to a chip comprised in the electronic detonator. An electronic detonator further comprises a detonator wire which is used to connect the electronic detonator to a primary wire of the blasting field. The primary wire in turn is connected to the initiating device 110. Each electronic detonator also has an associated identification code which may be unique to the electronic detonator. The identification code may be comprised in an identifier 141_1, 142_1 of the respective electronic detonator 141, 142. In at least some of the embodiments, the identifier 141_1, 142_1 may comprise a NFC tag. Alternatively, the identifier 141_1, 142_1 may comprise a NFC tag e.g. a barcode or a QR code.

FIG. 1 also shows a blasting field 150 with one or more bore holes 161-168 configured to receive explosives and one or more electronic detonators 141, 142. The blasting field 150 may be located e.g. in a mine, a quarry, a construction site, or the like. Typically, there are several bore holes in a blasting field. For example, a blasting field in a quarry may have two hundred or more bore holes. Often, the bore holes are arranged in a grid like pattern. The distance between two bore holes may be e.g. substantially two meters in direction and substantially three meters in another direction. The depth of a bore hole may be e.g. substantially 2-30 meters.

The locations of the bore holes 161-168 are indicated in a bore hole map, and transferred to a blasting plan. The bore hole map and the blasting plan may also include other information related to the bore holes 161-168, such as depth and/or diameter and/or inclination of each bore hole. When a given bore hole is assigned to receive two or more detonators, these detonators are typically arranged at different depths in the bore hole. In such a case, the blasting plan may also include information about the assigned depth of each detonator in the bore hole, and/or information about the assigned order in which the detonators are to be placed in the bore hole (the detonator to be placed first in the bore hole will typically be the one closest to the bottom of the bore hole, and the detonator to be placed last in the bore hole will typically be the one closest to the surface of the bore hole).

The locations and dimensions of the bore holes 161-168 together with the associated detonator delays may be used to control the direction of the power of the blast, e.g. away from nearby buildings, electric power lines, roads, and the like. The initiating device 110 is used to initiate the blasting of the field 150.

The following describes an example of how a blasting operation may proceed.

An operator operating a drill rig (a machine used to drill bore holes to stone) or the like at the blasting field 150 sets the coordinates for all the drilled bore holes 161-168 using the hand-held apparatus 200. Coordinates are fetched with the high-accuracy positioning unit 220 of the hand-held apparatus 200. This set up provides the operator a map of all the drilled holes 161-168. This map can then be projected on top of a topographic map or the like. Thus, the personnel involved in the blasting are able to see all the buildings, electric power lines, roads etc. that fall inside the hazardous area. Thus, the blasting can be planned in a way that minimizes risks by directing the power of the blast away from the aforementioned objects.

In another embodiment, GPS locations are not used to plan blast designs. Instead, the software for designing the blast may comprise a template for a field in which the bore holes are equidistant. Furthermore, the software for designing the blast may comprise an option to free-draw the field by hand.

The map comprising the bore holes 161-168 may be sent to the remote database 130 which may be part of a cloud service. Then, the personnel in charge of the blast and planning the blast will be able to download the aforementioned map to their own device(s).

The person planning the blast will start designing blast with the aforementioned map, optionally together with a topographic map or the like. A supervisor is able to view the design operation, optionally in real time, and is therefore able to e.g. give comments and suggestions regarding the plan.

The software for designing the blast may comprise a feature for creating a table of all the bore holes 161-168 of the field. Bore hole depths may also be provided to this table. The table may be automatically filled during the planning stage of the blast. The software may automatically calculate a total amount of e.g. detonators, secondary explosives and/or tertiary explosives that are needed. In addition, the software for designing the blast may comprise a feature for adding prices for the explosives and/or detonators.

The software for designing the blast may further comprise a feature for simulating the blasting. A simulation provides the blasting personnel with a view of how the blasting will advance. The simulation may provide an approximated location and size of the rock pile to be formed by the blast. Some or all the data from the designing software regarding the blast (herein referred to as a blasting plan) may be saved to the remote database 130. Furthermore, at least a part of the data regarding the blast may be shared with third-parties. Sharing the blast data may enable users to notice potential safety threats and faulty blast designs before actual blasting.

The blasting plan may be viewable by the blast personnel, and can be shared with storage personnel and retail personnel. Doing so allows the storage personnel and retail personnel to fulfill the order and pack it to be ready for the blast.

The blasting operators and people in charge of the blast will check the blasting plan (or blast design). If no problems are identified, the plan is accepted by the aforementioned personnel. Blasting operator(s) will arrange delivery for the needed explosives and detonators.

The blasting operator sets the detonators 141, 142 and primary explosives to the bore holes 161-168. The setting is performed with the hand-held apparatus 200 by opening the accepted blasting plan that has been downloaded and stored to the hand-held apparatus 200 from the remote database 130. Here, each detonator 141, 142 contains an identifying NFC tag 141_1, 142_1 which is read with the hand-held apparatus 200. At the same time, the high-accuracy positioning unit 220 will provide coordinates of the location in which the NFC tag was read. All the detonators will be set this way at every bore hole. The hand-held apparatus 200 updates the blasting plan with information about the read and identified detonators.

In addition or alternatively, the accepted blasting plan may be transferred to a vehicle or rig used for setting the detonators and explosives.

The blasting personnel may perform another simulation of the blast. If everything is in order, the updated blasting plan may be uploaded to the remote database 130. If no network connection is available, the uploading of the updated blasting plan may be delayed until network connection is established, without delaying the blasting of the field 150.

Then, the updated blasting plan is sent to the initiating device 110.

Every detonator 141, 142 at the field 150 is connected to the primary wire. The initiating device 110 will also be connected to the aforementioned primary wire. The initiating device 110 will check the condition of each detonator 141, 142 and report possible faulty detonators. Then, the initiating device 110 will program the detonators 141, 142 to the delays specified in the blasting plan.

Finally, the field 150 is blasted with the initiating device 110.

Since the generated blasting plan comprises information about the amount of explosives used in each bore hole as well as the connections and timings of the detonators, legal requirements are fulfilled. Similarly, legal requirements about archiving blasting plans are fulfilled since the blasting plan is stored in the remote database 130.

FIG. 2 is a block diagram of a hand-held apparatus 200 in accordance with an example embodiment. The hand-held apparatus 200 is configured to facilitate planning and/or implementing blasting operations.

The hand-held apparatus 200 comprises a display 210, a high-accuracy positioning unit 220, a detonator identifier reader 230, at least one processor 240, and at least one memory 250 comprising computer program code 255. Optionally, the hand-held apparatus 200 may comprise a wireless transceiver 260. The computer program code 255 corresponds to an application configured to facilitate planning and/or implementing blasting operations.

Although the hand-held apparatus 200 is depicted to include only one processor 240, the hand-held apparatus 200 may include more processors. In an embodiment, the memory 250 is capable of storing instructions 255, where the instructions 255 include machine executable instructions associated with facilitating planning and/or implementing of blasting operations. Furthermore, the processor 240 is capable of executing the stored instructions 255. In an embodiment, the processor 240 may be embodied as a multi-core processor, a single core processor, or a combination of one or more multi-core processors and one or more single core processors. For example, the processor 240 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 240 may be configured to execute hard-coded functionality. In an embodiment, the processor 240 is embodied as an executor of software instructions, wherein the instructions may specifically configure the processor 240 to perform the algorithms and/or operations described herein when the instructions are executed.

The memory 250 may be embodied as one or more volatile memory devices, one or more non-volatile memory devices, and/or a combination of one or more volatile memory devices and non-volatile memory devices. For example, the memory 250 may be embodied as semiconductor memories (such as mask ROM, PROM (programmable ROM), EPROM (erasable PROM), flash ROM, RAM (random access memory), etc.), or the like.

The detonator identifier reader 230 may comprise a near field communication (NFC) tag reader. As is known in the art, NFC is a short-range wireless connectivity technology standard designed for simple and safe communication between electronic devices. The technology is an extension of the ISO/IEC 14443 proximitycard standard. In an embodiment, the near field communication comprises radio-frequency identification (RFID). As is commonly known, the term "radio-frequency identification" refers to a technology that uses communication via electromagnetic waves to exchange data between a terminal and an object such as a product, animal, or person for the purpose of identification and tracking, for example.

The high-accuracy positioning unit 220 may comprise a positioning unit capable of positioning accuracy of at least substantially 50 centimeters, and/or capable of utilizing L5 positioning signaling. Examples of positioning systems include global navigation satellite systems (GNSS), such as Global Positioning System (GPS), Global Navigation Satellite System (GLONASS), Galileo, and the like.

The L5 frequency band is used at least by GPS. This frequency falls into a range for aeronautical navigation, with little or no interference under any circumstances. The L5 consists of two carrier components that are in phase quadrature with each other. L5 (also known as "the third civil GPS signal") is planned to support e.g. safety-of-life applications for aviation and provide improved availability and accuracy.

An example of the high-accuracy positioning unit 220 includes GPS chip BCM47755 from Broadcom, and the like.

In an embodiment, various components of the hand-held apparatus 200, such as the display 210, the high-accuracy positioning unit 220, the detonator identifier reader 230, the processor 240, the memory 250, and/or the wireless transceiver 260 are configured to communicate with each other via or through a centralized circuit 270. The centralized circuit 270 may be various devices configured to, among other things, provide or enable communication between the components 210-260 of the hand-held apparatus 200. In certain embodiments, the centralized circuit 270 may be a central printed circuit board (PCB) such as a motherboard, a main board, a hand-held apparatus board, or a logic board. The centralized circuit 270 may also, or alternatively, include other printed circuit assemblies (PCAs) or communication channel media.

The hand-held apparatus 200 as illustrated and hereinafter described is merely illustrative of a hand-held apparatus that could benefit from embodiments of the invention and, therefore, should not be taken to limit the scope of the invention. It is noted that the hand-held apparatus 200 may include fewer or more components than those depicted in FIG. 2.

The at least one memory 250 and the computer program code 255 are configured to, with the at least one processor 240, cause the hand-held apparatus 200 to determine the location of the hand-held apparatus based on signaling received by the high-accuracy positioning unit.

When the determined location of the hand-held apparatus 200 corresponds with a location of a bore hole in a stored blasting plan, the at least one memory 250 and the computer program code 255 are further configured to, with the at least one processor 240, cause the hand-held apparatus 200 to identify an electronic detonator based on an identifier of the electronic detonator read by the detonator identifier reader. The identifier of the electronic detonator may comprise at least an identification code of the electronic detonator. The identification code may be unique to the electronic detonator. The identification code may comprise e.g. an alphanumeric code. The identifier of the electronic detonator may be comprised in a NFC tag associated with the electronic detonator. The blasting plan may be stored e.g. in the at least one memory 250 of the hand-held apparatus 200.

The at least one memory 250 and the computer program code 255 are further configured to, with the at least one processor 240, cause the hand-held apparatus 200 to update the stored blasting plan to indicate that the identified electronic detonator has been set in the bore hole. The updating of the stored blasting plan may further comprise updating a delay for at least one assigned electronic detonator, and/or updating the amount of explosives assigned to a bore hole. For example, if a given bore hole is provided with a smaller or larger amount of explosives than originally assigned (either accidentally or on purpose), then the actual amount in the hole can be updated to the blasting plan.

Optionally, the at least one memory 250 and the computer program code 255 may be further configured to, with the at least one processor 240, cause the hand-held apparatus 200 to determine or calculate a difference between one or more parameters (such as the amount(s) and/or location(s) of explosives assigned to one or more bore holes, and/or delay(s) for one or more assigned electronic detonators) in the stored (i.e. original or non-updated) blasting plan and corresponding one or more parameters in the updated blasting plan (i.e. the blasting plan with the parameters that correspond with explosives/detonators currently set at the blasting field). Furthermore, in this optional embodiment, the at least one memory 250 and the computer program code 255 may be further configured to, with the at least one processor 240, cause the hand-held apparatus 200 to indicate the determined difference, e.g. on the display 210. Additionally, the user of the hand-held apparatus 200 may be requested to accept or reject the determined difference, e.g. via a prompt or the like displayed on the display 210.

Additionally, in this optional embodiment, the at least one memory 250 and the computer program code 255 may be further configured to, with the at least one processor 240, cause the hand-held apparatus 200 to compare the determined difference against a predetermined threshold, and if the determined difference exceeds the predetermined threshold, the at least one memory 250 and the computer program code 255 may be further configured to, with the at least one processor 240, cause the hand-held apparatus 200 to generate an alert or alarm.

The alert may comprise e.g. one or more of the following: a visual alert displayed e.g. on the display 210, 434, an audio alert output e.g. via a speaker 432, or an alert message sent to one or more recipients e.g. via wireless radio 440. In addition, the above discussed simulation of the blasting may be performed again using the updated blasting plan, e.g. to provide further insight on the severity of the determined difference(s) between the stored blasting plan and the updated blasting plan, thus facilitating determining whether any corrections need to be made to the updated blasting plan and to the explosives/detonators currently set at the blasting field.

The above described difference determination, difference indication, difference comparison and difference alerting may be performed e.g. after each time explosives/detonators have been set at a single bore hole, or after explosives/detonators have been set at multiple bore holes (such as all the bore holes).

The above described difference determination, difference indication, difference comparison and difference alerting provide added safety in blasting operations as they further ensure eliminating user mistakes, such as setting incorrect detonators and/or explosives for a given bore hole.

Optionally, the at least one memory 250 and the computer program code 255 may be further configured to, with the at least one processor 240, cause the hand-held apparatus 200 to indicate on the display 210 at least one electronic detonator assigned for the bore hole in the stored blasting plan before the electronic detonator is identified. In this case, the updating of the stored blasting plan comprises updating the stored blasting plan to indicate that the at least one assigned electronic detonator has been set in the bore hole when the identified electronic detonator corresponds with the at least one assigned electronic detonator.

More than one electronic detonator may be assigned for one bore hole in the stored blasting plan, for example a first electronic detonator 141 and a second electronic detonator 142. Here, the first assigned electronic detonator 141 (e.g. a detonator with a 10-meter wire) is to be placed lower in the bore hole than the second assigned electronic detonator 142 (e.g. a detonator with a 4-meter wire). The at least one memory 250 and the computer program code 255 may be further configured to, with the at least one processor 240, cause the hand-held apparatus 200 to perform the indication of the at least one assigned electronic detonator on the display 210 by first indicating the first assigned electronic detonator 141 on the display 210, and subsequently indicating the second assigned electronic detonator 142 on the display 210 after determining that the identified electronic detonator corresponds with the first assigned electronic detonator 141.

At least one of the electronic detonators 141, 142 may comprise a detonator wire having a length that corresponds with one of multiple predetermined length categories. At least one of the electronic detonators 141, 142 may further comprise a visual length indicator to indicate the corresponding length category of the detonator wire of the respective electronic detonator 141 or 142. The visual length indicator may comprise a color coded visual length indicator. In such a case, the indication of the at least one assigned electronic detonator on the display 210 may further comprise indicating this visual length indicator of the respective assigned electronic detonator 141 or 142 on the display 210. In this case, the identifier of the electronic detonator may comprises the above-described identification code of the electronic detonator, and a length code that corresponds with the length category of the detonator wire of the electronic detonator.

In an example, the detonator wire lengths and their associated colors include:
4-meter detonator: red
6-meter detonator: blue
10-meter detonator: yellow
15-meter detonator: white
20-meter detonator: orange
25-meter detonator: green
30-meter detonator: black.

The length code in the identifier of the electronic detonator may comprise e.g. a character indicating one of the above colors. Thus, a 4-meter detonator may have an associated identifier 00001R, 00002R, 00003R, etc., where the consecutive numbering indicates the identification code of the electronic detonator, and the 'R' indicates color 'red' and thus 4-meter wire length. Similarly, a 10-meter detonator may have an associated identifier 00001Y, 00002Y, 00003Y, etc., where the consecutive numbering again indicates the identification code of the electronic detonator, and the 'Y' indicates color 'yellow' and thus 10-meter wire length.

Furthermore, the visual length indicator may be shown at a suitable location on the surface of the respective detonator. For example, a 4-meter detonator may have a suitable surface portion of red color.

The at least one memory 250 and the computer program code 255 may be further configured to, with the at least one processor 240, cause the hand-held apparatus 200 to indicate on the display 210 the amount of assigned electronic detonators in the stored blasting plan that are yet to be set.

The at least one memory 250 and the computer program code 255 may be further configured to, with the at least one processor 240, cause the hand-held apparatus 200 to generate a bore hole map to be used for the blasting plan to be stored based on locations of each bore hole determined with the high-accuracy positioning unit 220 of the hand-held apparatus 200, as described in more detail in connection with FIG. 1.

The at least one memory 250 and the computer program code 255 may be further configured to, with the at least one processor 240, cause the hand-held apparatus 200 to download the blasting plan to be stored in the hand-held apparatus from a remote database via the wireless transceiver 260. Furthermore, the at least one memory 250 and the computer program code 255 may be further configured to, with the at least one processor 240, cause the hand-held apparatus 200 to upload the updated blasting plan to the remote database via the wireless transceiver 260.

In an embodiment, the initiating device 110 and/or the hand-held apparatus 200 may be associated or paired with a context based safety device 290 that allows using the initiating device 110 and/or the hand-held apparatus 200 only within a specified context.

In an example, the context may include the proximity of a predetermined user of the initiating device 110 and/or the hand-held apparatus 200. For example, the context based safety device 290 may be a chip or the like carried by the predetermined user (or e.g. embedded under the skin of the predetermined user), and the initiating device 110 and/or the hand-held apparatus 200 may be activated or allowed to operate only when it senses (e.g. via a proximity sensor such as the NFC reader 230, or the like) the context based safety device 290 in its proximity.

Additionally, the context may include a predetermined time, such as a time window (time of day, day of week, or the like) and/or a predetermined location, such as being within an operating range specified for the initiating device 110 and/or the hand-held apparatus 200. Thus, for example, the initiating device 110 and/or the hand-held apparatus 200 may be activated or allowed to operate only when it is in the proximity of the predetermined user and when the predetermined time and/or location match. Additionally or alternatively, the context may include a location as a pre-specified area, such as range of coordinates of the initiating device and/or the hand-held apparatus. Alternatively, the context may comprise a minimum distance between the blasting field and the hand-held device.

Additionally or alternatively, the context based safety device 290 may be used to authenticate the right to perform e.g. the transmission of the blasting plan from the hand-held apparatus 200 to the initiating device 110 (or any other data transmission between the hand-held apparatus 200 and the initiating device 110). In an example in which the context based safety device 290 is based on NFC technology, before initiating the transmission, a prompt may be displayed on the display 210 of the hand-held apparatus 200 asking the user to place the context based safety device 290 in the proximity of the NFC reader 230. Only if the context based safety device 290 is successfully authenticated, the data transmission between the hand-held apparatus 200 and the initiating device 110 may proceed.

The above described context based safety measures provide added safety in blasting operations as they further ensure that only authorized personnel can use the initiating device 110 and/or the hand-held apparatus 200 and optionally only at authorized time/location.

Figure 3:
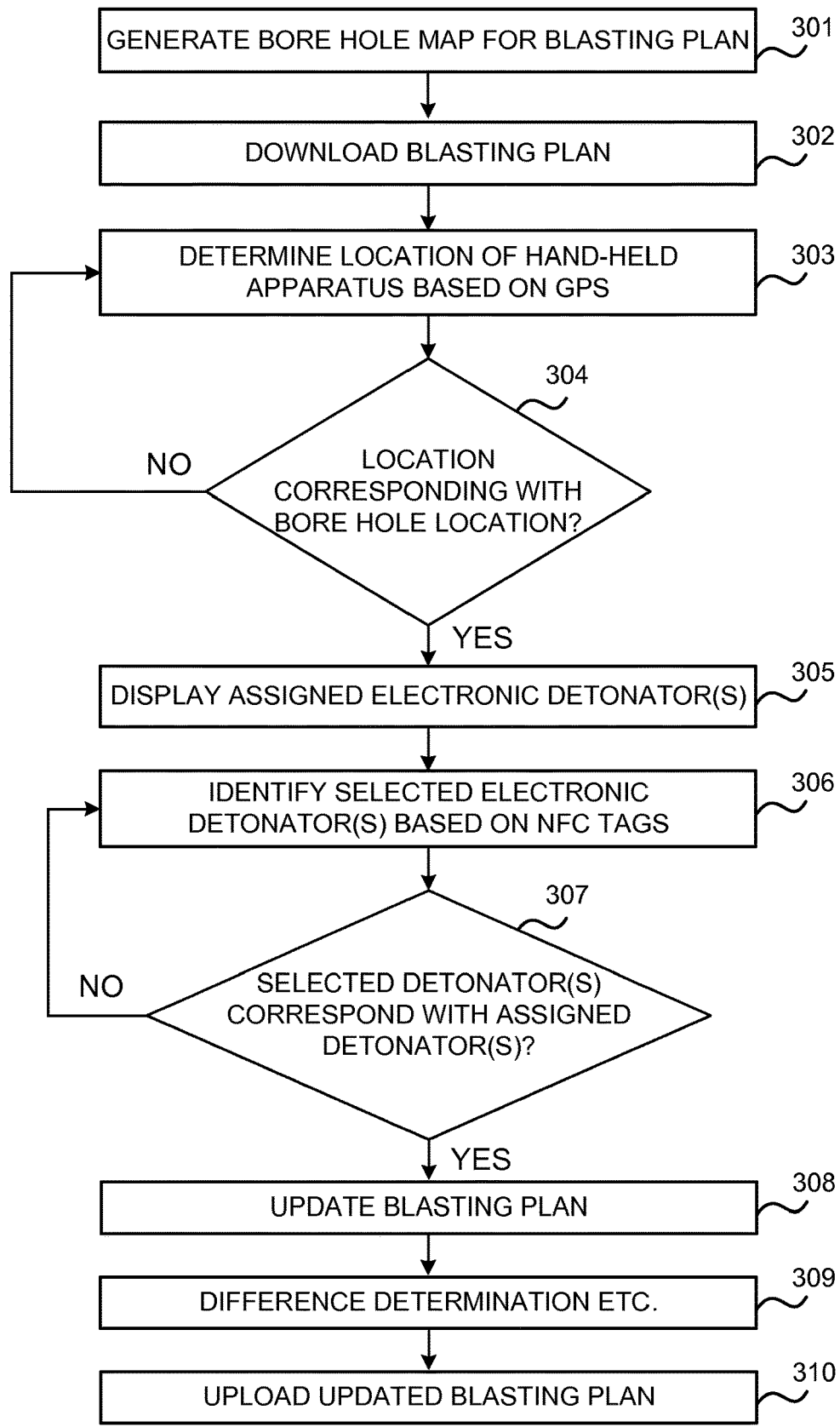
FIG. 3 illustrates an example flow diagram of a method in accordance with an example embodiment.

FIG. 3 illustrates an example flow diagram of a method 300 of facilitating planning and/or implementation of blasting operations in accordance with an example embodiment. The example of FIG. 3 may be used e.g. by the hand-held apparatus 200 of FIG. 2 and/or the hand-held apparatus 400 of FIG. 4. Further features of the method 300 directly result from the functionalities of the hand-held apparatus 200 and the hand-held apparatus 400. The method 300 can be performed by a computer program.

At optional operation 301, a bore hole map to be used for the blasting plan to be stored is generated by a hand-held apparatus based on locations of each bore hole determined with a high-accuracy positioning unit of the hand-held apparatus.

At optional operation 302, the blasting plan to be stored in the hand-held apparatus is downloaded to the hand-held apparatus from a remote database via a wireless transceiver of the hand-held apparatus.

At operation 303, the location of the hand-held apparatus is determined by the hand-held apparatus based on signaling received by the high-accuracy positioning unit of the hand-held apparatus.

At operation 304, it is determined whether the determined location of the hand-held apparatus corresponds with a location of a bore hole in a stored blasting plan. If yes, at optional operation 305, at least one electronic detonator assigned for this bore hole in the stored blasting plan is indicated by the hand-held apparatus on a display of the hand-held apparatus. If not, the method 300 returns to operation 303.

At operation 306, an electronic detonator (e.g. selected or picked up by the user of the hand-held apparatus) is identified by the hand-held apparatus based on an identifier of the electronic detonator read by a detonator identifier reader of the hand-held apparatus.

At optional operation 307, it is determined whether the identified electronic detonator corresponds with the at least one assigned electronic detonator. If yes, the stored blasting plan is updated by the hand-held apparatus to indicate that the at least one assigned electronic detonator has been set in the bore hole, operation 308. If not, the method 300 returns to operation 306. When optional operations 305 and 307 are not performed, the stored blasting plan is updated in operation 308 by the hand-held apparatus to indicate that the electronic detonator identified in operation 306 has been set in the bore hole.

At optional operation 309, difference determination, difference indication, difference comparison and/or difference alerting are performed, as described in more detail above in connection with FIG. 2.

At optional operation 310, the updated blasting plan is uploaded from the hand-held apparatus to the remote database via the wireless transceiver.

FIG. 4 illustrates another example of a hand-held apparatus 400 capable of implementing example embodiments described herein. It should be understood that the hand-held apparatus 400 as illustrated and hereinafter described is merely illustrative of one type of electronic apparatus or device and should not be taken to limit the scope of the embodiments. As such, it should be appreciated that at least some of the components described below in connection with the hand-held apparatus 400 may be optional and thus in an example embodiment may include more, less or different components than those described in connection with the example embodiment of FIG. 4. As such, among other examples, the hand-held apparatus 400 could be any suitable hand-held computer device, such as any suitable smart phone, tablet computer, laptop computer, a two-in-one hybrid (or laptop-tablet hybrid) computer, and the like, with a suitable high-accuracy positioning unit and a suitable detonator identifier reader.

The illustrated hand-held apparatus 400 includes a controller or a processor 402 (i.e.—a signal processor, microprocessor, ASIC, or other control and processing logic circuitry) for performing such tasks as signal coding, data processing, input/output processing, power control, and/or other functions. An operating system 404 controls the allocation and usage of the components of the hand-held apparatus 400 and support for one or more application programs 406. The application programs 406 can include application(s) related to facilitating planning and/or implementation of blasting operations in accordance with example embodiments, or any other applications.

The illustrated hand-held apparatus 400 includes one or more memory components, for example, a non-removable memory 408 and/or removable memory 410. The non-removable memory 408 may include RAM, ROM, flash memory, a hard disk, or other well-known memory storage technologies. The removable memory 410 may include flash memory (such as one or more removable flash drives) or smart cards. The one or more memory components may be used for storing data and/or code for running the operating system 404 and the applications 406. Example of data may include text, images, sound files, image data, video data, or other data sets to be sent to and/or received from one or more network servers or other devices via one or more wired or wireless networks.

The hand-held apparatus 400 can support one or more input devices 420 and one or more output devices 430. Examples of the input devices 420 may include, but are not limited to, a touchscreen 422 (i.e., capable of capturing finger tap inputs, finger gesture inputs, multi-finger tap inputs, multi-finger gesture inputs, or keystroke inputs from a virtual keyboard or keypad), a microphone 424 (i.e., capable of capturing voice input), a camera module 426 (i.e., capable of capturing still picture images and/or video images) and a physical keyboard 428. Examples of the output devices 430 may include, but are not limited to a speaker 432 and a display 434. Other possible output devices (not shown) can include piezoelectric or other haptic output devices. Some devices can serve more than one input/output function. For example, the touchscreen 422 and the display 434 can be combined into a single input/output device. The display 434 may comprise the display 210 of FIG. 2.

In an embodiment, the hand-held apparatus 400 may comprise a wireless radio(s) 440. The wireless radio(s) 440 can support two-way communications between the processor 402 and external devices, as is well understood in the art. The wireless radio(s) 440 are shown generically and can include, for example, a cellular modem 442 for communicating at long range with the mobile communication network, a Wi-Fi radio 444 for communicating at short range with a local wireless data network or router, and/or a GPS unit 446 for providing positioning/navigation services. The cellular modem 442 is typically configured for communication with one or more cellular networks, such as a GSM/3G/4G/5G network for data and voice communications within a single cellular network, between cellular networks, or between the mobile device and a public switched telephone network (PSTN).

The hand-held apparatus 400 can further include one or more input/output ports 450, a power supply 452, one or more sensors 454 (for example an accelerometer, a gyroscope, a compass, or an infrared proximity sensor for detecting the orientation or motion of the hand-held apparatus 400), a transceiver 456 (for wirelessly transmitting analog or digital signals), and a NFC reader 412. The NFC reader 412 may comprise the detonator identifier reader 230 of FIG. 2, and the GPS unit 446 may comprise the high-accuracy positioning unit 220 of FIG. 2. The illustrated components are not required or all-inclusive, as any of the components shown can be deleted and other components can be added.

The exemplary embodiments can include, for example, any suitable servers, workstations, personal computers, laptop computers, other devices, and the like, capable of performing the processes of the exemplary embodiments. The devices and subsystems of the exemplary embodiments can communicate with each other using any suitable protocol and can be implemented using one or more programmed computer systems or devices.

One or more interface mechanisms can be used with the exemplary embodiments, including, for example, Internet access, telecommunications in any suitable form (e.g., voice, modem, and the like), wireless communications media, and the like. For example, employed communications networks or links can include one or more satellite communications networks, wireless communications networks, cellular communications networks, 3G communications networks, 4G communications networks, 5G communications networks, Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware and/or software art(s). For example, the functionality of one or more of the components of the exemplary embodiments can be implemented via one or more hardware and/or software devices.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be conveniently implemented using one or more general purpose processors, microprocessors, digital signal processors, micro-controllers, and the like, programmed according to the teachings of the exemplary embodiments of the present inventions, as will be appreciated by those skilled in the computer and/or software art(s). Appropriate software can be readily prepared by programmers of ordinary skill based on the teachings of the exemplary embodiments, as will be appreciated by those skilled in the software art. In addition, the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware and/or software.

Stored on any one or on a combination of computer readable media, the exemplary embodiments of the present inventions can include software for controlling the components of the exemplary embodiments, for driving the components of the exemplary embodiments, for enabling the components of the exemplary embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the exemplary embodiments of the present inventions can include any suitable interpretable or executable code mechanism, including but not limited to, scripts, interpretable programs, dynamic link libraries (DLLs), Java classes and applets, complete executable programs, Common Passenger Request Broker Architecture (CORBA) passengers, and the like. Moreover, parts of the processing of the exemplary embodiments of the present inventions can be distributed for better performance, reliability, cost, and the like.

As stated above, the components of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, and the like. Non-volatile media can include, for example, optical or magnetic disks, magneto-optical disks, and the like. Volatile media can include dynamic memories, and the like. Common forms of computer-readable media can include, for example, a floppy disk, a flexible disk, hard disk, or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

The invention claimed is:

1. A hand-held apparatus, comprising:
   a display;
   a high-accuracy positioning unit comprising at least one of a positioning unit capable of positioning accuracy of at least substantially 50 centemeters or a positioning unit capable of utilizing L5 positioning signaling;
   a detonator identifier reader:
   at least one processor; and
   at least one memory comprising computer program code, the at least one memory and the computer program code configured to, with the at least one processor, cause the hand-held apparatus to at least:
   determine the location of the hand-held apparatus based on signaling received by the high-accuracy positioning unit;
   in response to the determined location of the hand-held apparatus corresponding with a location of a bore hole in a stored blasting plan:
   identify an electronic detonator based on an identifier of the electronic detonator read by the detonator identifier reader; and
   update the stored blasting plan to indicate that the identified electronic detonator has been set in said bore hole.

2. The hand-held apparatus according to claim 1, wherein the at least one memory and the computer program code are further configured to, with the at least one processor, cause the hand-held apparatus to:
   before identifying the electronic detonator, indicate on the display at least one electronic detonator assigned for said bore hole in the stored blasting plan; and
   wherein the updating of the stored blasting plan comprises:
   in response to the identified electronic detonator corresponding with the at least one assigned electronic detonator, updating the stored blasting plan to indicate that the at least one assigned electronic detonator has been set in said bore hole.

3. The hand-held apparatus according to claim 2, wherein the at least one electronic detonator assigned for the bore hole in the stored blasting plan comprises at least a first assigned electronic detonator and a second assigned electronic detonator, the first assigned electronic detonator to be placed lower in the bore hole than the second assigned electronic detonator, and wherein the at least one memory and the computer program code are further configured to, with the at least one processor, cause the hand-held apparatus to perform the indication of the at least one assigned electronic detonator on the display by first indicating the first assigned electronic detonator on the display, and subsequently indicating the second assigned electronic detonator on the display in response to determining that the identified electronic detonator corresponds with the first assigned electronic detonator.

4. The hand-held apparatus according to claim 2, wherein each electronic detonator comprises a detonator wire having a length corresponding with one of multiple predetermined length categories.

5. The hand-held apparatus according to claim 4, wherein at least one electronic detonator further comprises a visual length indicator to indicate the corresponding length category of the detonator wire of the respective electronic detonator.

6. The hand-held apparatus according to claim 5, wherein the visual length indicator comprises a color coded visual length indicator.

7. The hand-held apparatus according to claim 5, wherein the indication of the at least one assigned electronic detonator on the display further comprises indicating on the display the visual length indicator of the respective assigned electronic detonator.

8. The hand-held apparatus according to claim 4, wherein the identifier of the electronic detonator comprises an identification code of the electronic detonator, and a length code corresponding with the length category of the detonator wire of the electronic detonator.

9. The hand-held apparatus according to claim 2, wherein the indication of the at least one assigned electronic detonator on the display further comprises indicating on the display the amount of assigned electronic detonators in the stored blasting plan left to be set.

10. The hand-held apparatus according to claim 1, wherein the at least one memory and the computer program code are further configured to, with the at least one processor, cause the hand-held apparatus to generate a bore hole map to be used for the blasting plan to be stored based on locations of each bore hole determined with the high-accuracy positioning unit of the hand-held apparatus.

11. The hand-held apparatus according to claim 1, further comprising a wireless transceiver, wherein the at least one memory and the computer program code are further configured to, with the at least one processor, cause the hand-held apparatus to at least one of: download the blasting plan to be stored in the hand-held apparatus from a remote database via the wireless transceiver, and upload the updated blasting plan to the remote database via the wireless transceiver.

12. The hand-held apparatus according to claim 1, wherein the updating of the stored blasting plan further comprises at least one of: updating a delay for at least one assigned electronic detonator, and updating the amount of explosives assigned to a bore hole.

13. The hand-held apparatus according to claim 1, wherein the detonator identifier reader comprises a near field communication tag reader and the identifier of the electronic detonator is comprised in a near field communication tag associated with the electronic detonator.

14. The hand-held apparatus according to claim 1, wherein the at least one memory and the computer program code are further configured to, with the at least one processor, cause the hand-held apparatus to determine a difference between one or more parameters in the stored blasting plan and corresponding one or more parameters in the updated blasting plan.

15. The hand-held apparatus according to claim 14, wherein the at least one memory and the computer program code are further configured to, with the at least one processor, cause the hand-held apparatus to at least one of: indicate the determined difference, and generate a request to accept or reject the determined difference.

16. The hand-held apparatus according to claim 14, wherein the at least one memory and the computer program code are further configured to, with the at least one processor, cause the hand-held apparatus to compare the determined difference against a predetermined threshold, and in response to the determined difference exceeding the predetermined threshold, to generate an alert.

17. The hand-held apparatus according to claim 1, wherein the hand-held apparatus is associated with a context based safety device allowing use of the hand-held apparatus only within a specified context.

18. A method, comprising:
- determining, by a hand-held apparatus, the location of the hand-held apparatus based on signaling received by a high-accuracy positioning unit of the hand-held apparatus, the high-accuracy positioning unit comprising at least one of a positioning unit capable of positioning accuracy of at least substantially 50 centemeters or a positioning unit capable of utilizing L5 positioning signaling;
- in response to the determined location of the hand-held apparatus corresponding with a location of a bore hole in a stored blasting plan:
- identifying, by the hand-held apparatus, an electronic detonator based on an identifier of the electronic detonator read by a detonator identifier reader of the hand-held apparatus; and
- updating, by the hand-held apparatus, the stored blasting plan to indicate that the identified electronic detonator has been set in said bore hole.

19. A computer program product comprising at least one computer-readable storage medium, the computer-readable storage medium comprising a set of instructions, which, when executed by one or more processors, cause a hand-held apparatus to at least perform:
- determining, by a hand-held apparatus, the location of the hand-held apparatus based on signaling received by a high-accuracy positioning unit of the hand-held apparatus, the high-accuracy positioning unit comprising at least one of a positioning unit capable of positioning accuracy of at least substantially 50 centemeters or a positioning unit capable of utilizing L5 positioning signaling;
- in response to the determined location of the hand-held apparatus corresponding with a location of a bore hole in a stored blasting plan:
- identifying, by the hand-held apparatus, an electronic detonator based on an identifier of the electronic detonator read by a detonator identifier reader of the hand-held apparatus; and
- updating, by the hand-held apparatus, the stored blasting plan to indicate that the identified electronic detonator has been set in said bore hole.

* * * * *